(12) United States Patent
Park (10) Patent No.: US 9,310,942 B2
(45) Date of Patent: Apr. 12, 2016

(54) DISPLAY DEVICE HAVING TOUCH SENSOR REDUCING LIMIT IN DRIVING TIME OF PIXEL ARRAY AND DRIVING TIME OF TOUCH SENSOR AND METHOD FOR DRIVING THE SAME

(75) Inventor: Dongjo Park, Seoul (KR)

(73) Assignee: LG DISPLAY CO., LTD., Seoul (KR)

( * ) Notice: Subject to any disclaimer, the term of this patent is extended or adjusted under 35 U.S.C. 154(b) by 373 days.

(21) Appl. No.: 13/442,548

(22) Filed: Apr. 9, 2012

(65) Prior Publication Data

US 2012/0256861 A1    Oct. 11, 2012

(30) Foreign Application Priority Data

Apr. 7, 2011    (KR) .................. 10-2011-0032100

(51) Int. Cl.
G06F 3/041    (2006.01)
G06F 3/044    (2006.01)

(52) U.S. Cl.
CPC ..................... *G06F 3/044* (2013.01)

(58) Field of Classification Search
CPC ....... G06F 3/044; G06F 3/045; G06F 3/0418; G06F 3/041; H03K 17/962; H03K 17/955
USPC ................ 345/173, 174, 690, 207; 178/18.06
See application file for complete search history.

(56) References Cited

U.S. PATENT DOCUMENTS

| 2005/0162448 A1* | 7/2005 | Aoki .............................. 345/690 |
| 2008/0309627 A1 | 12/2008 | Hotelling et al. |
| 2010/0090967 A1* | 4/2010 | Jang .............................. 345/173 |
| 2010/0110040 A1* | 5/2010 | Kim et al. ..................... 345/174 |
| 2010/0300773 A1* | 12/2010 | Cordeiro et al. ............ 178/18.06 |
| 2010/0328259 A1* | 12/2010 | Ishizaki et al. ................ 345/174 |
| 2011/0090160 A1* | 4/2011 | Chen et al. ..................... 345/173 |
| 2011/0115729 A1* | 5/2011 | Kremin et al. ................ 345/173 |
| 2011/0157077 A1* | 6/2011 | Martin ................... G06F 3/0418 345/174 |
| 2011/0164012 A1* | 7/2011 | Maeda et al. ................. 345/207 |
| 2011/0210927 A1 | 9/2011 | Mizuhashi et al. |
| 2011/0310054 A1* | 12/2011 | Souchkov ..................... 345/174 |

FOREIGN PATENT DOCUMENTS

| CN | 101950093 A | 1/2011 |
| TW | 201211851 A1 | 3/2012 |

* cited by examiner

*Primary Examiner* — Srilakshmi K Kumar
*Assistant Examiner* — James Nokham
(74) *Attorney, Agent, or Firm* — Birch, Stewart, Kolasch & Birch, LLP (57) ABSTRACT

According to an embodiment, a touch-sensitive display device includes a display panel including data lines, gate lines crossing the data lines, and a pixel array including pixels arranged in a matrix form; a touch screen including Tx lines, Rx lines crossing the Tx lines, and touch sensors formed at crossings of the Tx lines and the Rx lines; a display driving circuit configured to supply video data voltages to the pixels of the display panel; and a touch screen driving circuit configured to sequentially supply at least one delayed pulse to each of the Tx lines, and sense an output signal of each of the touch sensors through the Rx lines, wherein an edge of each of the at least one delayed pulse is present in a horizontal blank period.

16 Claims, 9 Drawing Sheets

FIG. 12

DISPLAY DEVICE HAVING TOUCH SENSOR REDUCING LIMIT IN DRIVING TIME OF PIXEL ARRAY AND DRIVING TIME OF TOUCH SENSOR AND METHOD FOR DRIVING THE SAME

This application claims the priority benefit of Korean Patent Application No. 10-2011-0032100 filed on Apr. 7, 2011, the entire contents of which is incorporated herein by reference for all purposes as if fully set forth herein.

BACKGROUND OF THE INVENTION

1. Field of the Invention

Embodiments of the invention relate to a display device having touch sensors and a method for driving the same.

2. Discussion of the Related Art

A touch screen has replaced button switches as a user input device in order to provide light weight and thin profile to household appliances and electronic devices. The touch screen includes a plurality of touch sensors and is mounted on a display panel of a display element. Recently, the touch screen embedded in the display panel has been developed.

Capacitive touch sensors may be generally implemented using a mutual capacitance manner. The capacitive touch sensors include mutual capacitances formed at crossings of signal lines of the display panel. When the user's finger approaches the mutual capacitance of the capacitive touch sensors, an electric field between electrodes is blocked, and a charge amount of the mutual capacitance decreases. Hence, the capacitive touch sensors may measure changes in the charge amount of the mutual capacitance before and after a touch operation and thus may recognize the touch operation.

The touch sensors of the touch screen may be coupled with one another through signal lines of a pixel array of the display panel and a parasitic capacitance. In this instance, pixel driving signals supplied to the signal lines connected to the pixels of the display panel may adversely affect the output signals of the touch sensors. Thus, a method for reducing an influence of the pixel driving signals operating as a noise component on the output signals of the touch sensors is necessary. The signal lines of the pixel array include data lines to which a video data voltage to charge the pixels is supplied, scan lines (or gate lines) crossing the data lines and to which a scan pulse (or a gate pulse) for selecting the pixels charged to the video data voltage is supplied, etc. The pixel driving signals include the video data voltage, the scan pulse, etc.

To reduce the influence of the pixel driving signals on the output signals of the touch sensors, one frame period may be divided into a display period and a touch sensor driving period, and the touch screen and the pixel array may be driven in a time division manner. During the display period, the pixel driving signals are supplied to the signal lines of the pixel array, and the video data voltage is applied to the pixels of the pixel array. During the touch sensor driving period, the pixels of the pixel array are held at the video data voltage to which the pixels have been charged during the display period, and a Tx pulse is supplied to the touch sensors to read out an output of the touch sensors. Because the touch sensor driving period is separated from the display period in terms of time, an influence of a pixel driving signals may be minimized or excluded from the output signals of the touch sensors. However, when one frame period is divided into the display period and the touch sensor driving period, if the touch sensor driving period lengthens, the display period may be relatively shortened. On the contrary, if the display period lengthens, the touch sensor driving period may be shortened. Thus, it is difficult to cope with changes in a driving method and an increase in a resolution of the pixel array or the touch screen using the time-division driving method.

SUMMARY OF THE INVENTION

The present invention provides a display device having touch sensors and a method of operating the display, which address the limitations and disadvantages associated with the related art.

Embodiments of the invention provide a display device having touch sensors, which are not affected by a driving signal of a pixel array and can reduce a limit in a driving time of the pixel array and a driving time of the touch sensors, and a method for driving the display.

Embodiments of the present invention provides a touch-sensitive display device and a method of driving the same, which reduce a noise effect of pixel driving signals on the output signals of touch sensors, without having to divide a frame period into a display period and a touch sensor driving period.

In one aspect, there is a display device including a display panel including data lines, gate lines crossing the data lines, and a pixel array including pixels arranged in a matrix form; a touch screen including Tx lines, Rx lines crossing the Tx lines, and touch sensors formed at crossings of the Tx lines and the Rx lines; a display driving circuit configured to apply a video data voltage to the pixels of the display panel; and a touch screen driving circuit configured to sequentially supply a Tx pulse, which is delayed by a predetermined time, to the Tx lines and sense an output signal of each touch sensor, which is synchronized with the Tx pulse and is received through the Rx lines, in a horizontal blank period.

According to an embodiment, the present invention provides a touch-sensitive display device including: a display panel including data lines, gate lines crossing the data lines, and a pixel array including pixels arranged in a matrix form; a touch screen including Tx lines, Rx lines crossing the Tx lines, and touch sensors formed at crossings of the Tx lines and the Rx lines; a display driving circuit configured to supply video data voltages to the pixels of the display panel; and a touch screen driving circuit configured to sequentially supply at least one delayed pulse to each of the Tx lines, and sense an output signal of each of the touch sensors through the Rx lines, wherein an edge of each of the at least one delayed pulse is present in a horizontal blank period.

According to an embodiment, the present invention provides a method of operating a touch-sensitive display device, the touch-sensitive display device including a display panel, a touch screen, a display driving circuit and a touch screen driving circuit, the display panel including data lines, gate lines crossing the data lines, and a pixel array including pixels arranged in a matrix form, the touch screen including Tx lines, Rx lines crossing the Tx lines, and touch sensors formed at crossings of the Tx lines and the Rx lines, the display driving circuit configured to supply video data voltages to the pixels of the display panel, the method including: operating the touch screen using the touch screen driving circuit, wherein the operating step includes: sequentially supplying, by the touch screen driving circuit, at least one delayed pulse to each of the Tx lines of the touch screen, wherein an edge of each of the at least one delayed pulse is present in a horizontal blank period, and sensing, by the touch screen driving circuit, an output signal of each of the touch sensors through the Rx lines.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE EMBODIMENTS

Reference will now be made in detail to embodiments of the invention, examples of which are illustrated in the accompanying drawings. Wherever possible, the same reference numbers will be used throughout the drawings to refer to the same or like parts. It will be paid attention that detailed description of known arts will be omitted if it is determined that the arts can mislead the embodiments of the invention.

As shown in FIGS. 1 to 4, a display device according to an example embodiment of the invention includes a display panel DIS including a pixel array and a touch screen, a display driving circuit for writing video data to pixels of the display panel DIS, and a touch screen driving circuit for driving the touch screen.

Figure 1:
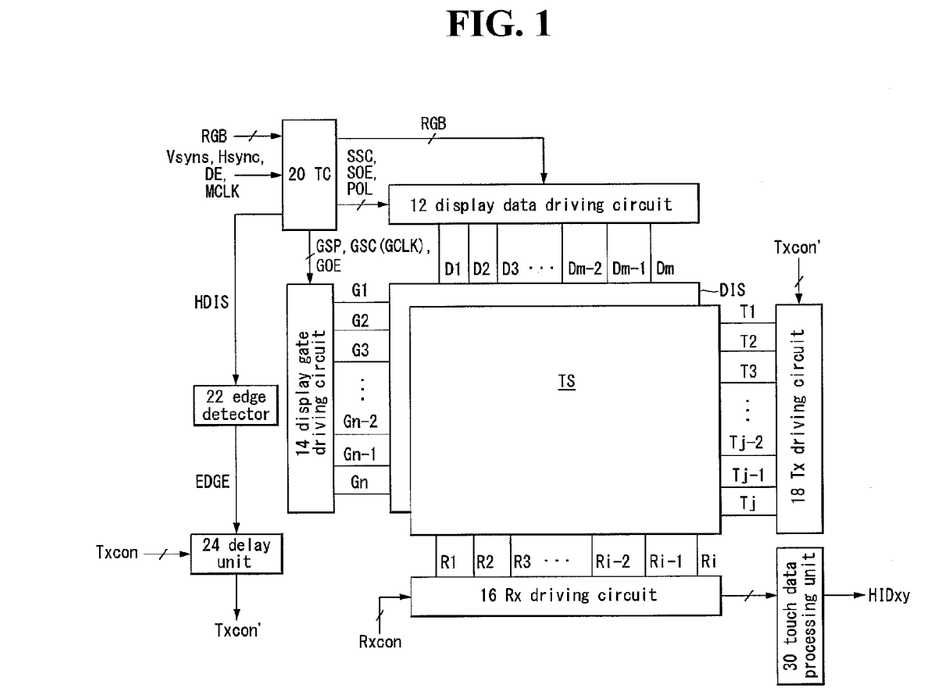
FIG. 1 is a block diagram of a display device according to an example embodiment of the invention.

The display device according to the embodiment of the invention further includes a touch data processing unit 30, a timing controller 20, a synchronous control circuit, etc. All components of the display device are operatively coupled and configured.

The display driving circuit for driving the pixel array includes a display data driving circuit 12 and a display gate driving circuit 14. The display driving circuit writes a video data to the pixels on one horizontal line and sequentially performs the above writing operation on the pixels of other horizontal lines of the display panel DIS during one frame period. The video data is written to or applied to the pixels of the display panel DIS every time a gate pulse (or a scan pulse) is generated during one horizontal period. Namely, a pulse width time of the gate pulse corresponds to a data writing period.

The touch screen driving circuit for driving the touch screen includes a Tx driving circuit 18 and a Rx driving circuit 16. The touch screen driving circuit sequentially supplies a Tx pulse EXTP (FIG. 6) to Tx lines T1 to Tj of the touch screen, where j is a positive integer. The Tx pulse EXTP is a Tx pulse that has been delayed by a predetermined time and successively supplied to each of the Tx lines T1 to Tj more than twice per each Tx line, for example. The Tx lines are also referred to herein as transmit lines. The touch screen driving circuit synchronizes touch sensor output signals, which are received from the touch sensors TS of the touch screen through Rx lines R1 to Ri of the touch screen, where i is a positive integer, with a falling edge of the Tx pulse EXTP, and samples the touch sensor output signals. The Rx lines are also referred to herein as receive lines.

The display device according to the embodiment of the invention includes a flat panel display, such as a liquid crystal display (LCD), a field emission display (FED), a plasma display panel (PDP), an organic light emitting diode (OLED) display, and an electrophoresis display (EPD), and the touch screen. In the following description, the liquid crystal display is used as an example of the flat panel display. Other flat panel displays may be used.

The display panel DIS includes a lower glass substrate GLS2, an upper glass substrate GLS1, and a liquid crystal layer formed between the lower glass substrate and the upper glass substrate. The lower glass substrate GLS2 of the display panel DIS includes a plurality of data lines D1 to Dm, where m is a positive integer, a plurality of gate lines G1 to Gn crossing the data lines D1 to Dm, where n is a positive integer, a plurality of thin film transistors (TFTs) formed at crossings of the data lines D1 to Dm and the gate lines G1 to Gn, a plurality of pixel electrodes for charging liquid crystal cells to the video data voltage, a plurality of storage capacitors, each of which is connected to the pixel electrode and holds a voltage of the liquid crystal cell, etc. The display panel DIS can use any known display panel structure.

The pixels of the display panel DIS are respectively formed in pixel areas defined by the data lines D1 to Dm and the gate lines G1 to Gn in a matrix form. The liquid crystal cell of each pixel is driven by an electric field generated depending on a voltage difference between the video data voltage supplied to the pixel electrode and a common voltage supplied to a common electrode, thereby adjusting an amount of light transmitted by the liquid crystal cell. The TFTs are turned on in response to the gate pulse from the gate lines G1 to Gn, thereby supplying the voltage from the data lines D1 to Dm to the pixel electrodes of the liquid crystal cells. In a vertical electric field driving manner such as a twisted nematic (TN) mode and a vertical alignment (VA) mode, the common electrode is formed on the upper glass substrate. In a horizontal electric field driving manner such as an in-plane switching (IPS) mode and a fringe field switching (FFS) mode, the common electrode is formed on the lower glass substrate along with the pixel electrode.

The upper glass substrate GLS1 of the display panel DIS may include black matrixes, color filters, etc. The lower glass substrate GLS2 of the display panel DIS may be configured in a color filter on TFT (COT) structure. In this instance, the black matrixes and the color filters may be formed on the lower glass substrate of the display panel DIS.

Polarizing plates POL1 and POL2 are respectively attached to the upper and lower glass substrates of the display panel DIS. Alignment layers for setting a pre-tilt angle of liquid crystals are respectively formed on the inner surfaces contacting the liquid crystals in the upper and lower glass substrates of the display panel DIS. A column spacer may be formed between the upper and lower glass substrates of the display panel DIS to keep cell gaps of the liquid crystal cells constant.

Figure 2:
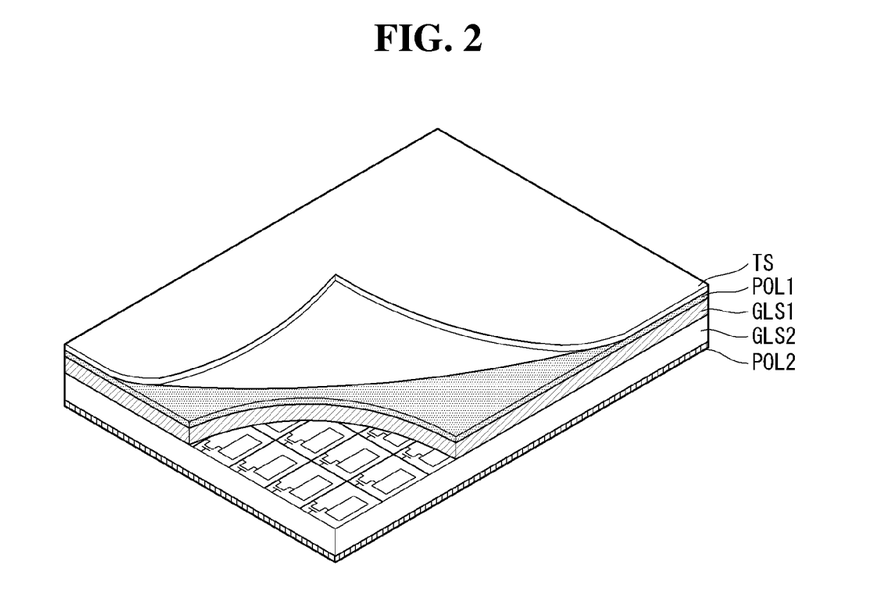
FIGS. 2 to 4 illustrate various configurations of a touch screen and a display panel according to an embodiment of the present invention.
Figure 3:
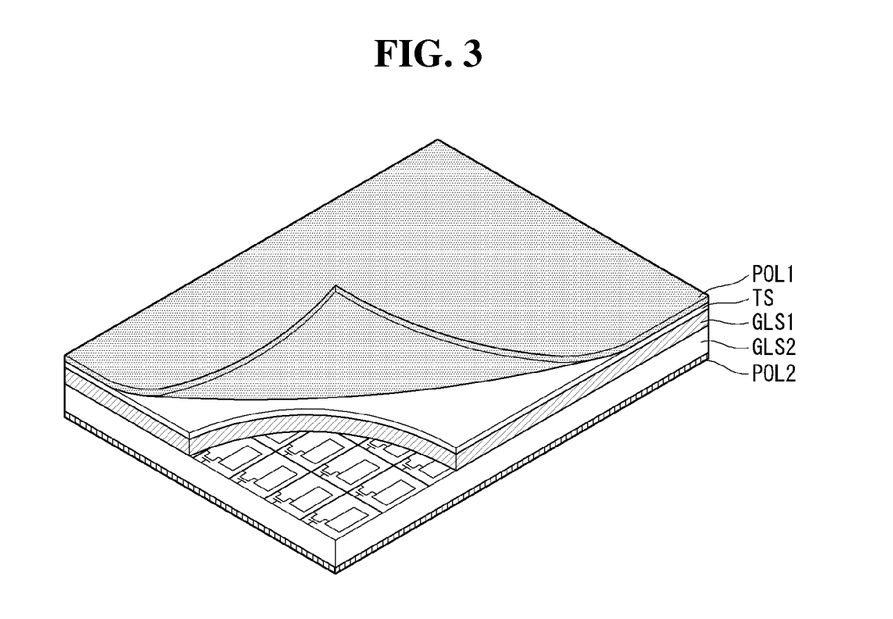

A backlight unit may be disposed in the rear of the display panel DIS. The backlight unit may be configured as one of an edge type backlight unit and a direct type backlight unit to provide light to the display panel DIS. The backlight unit can include one or more light sources such as a lamp, light emitting diodes, etc. As shown in FIG. 2, the touch sensors TS of the touch screen may be stacked on the upper polarizing plate POL1 of the display panel DIS. Alternatively, as shown in FIG. 3, the touch sensors TS may be formed between the upper polarizing plate POL1 and the upper glass substrate GLS1.

Figure 4:
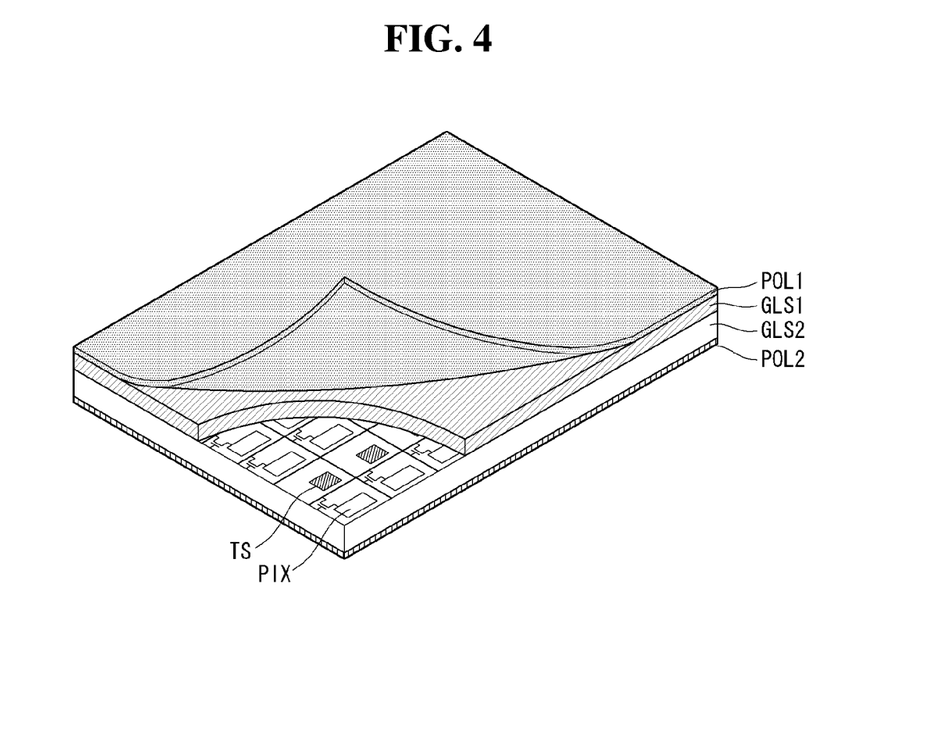

In another example as shown in FIG. 4, the touch sensors TS may be formed on the lower glass substrate GLS2 along with the pixel array of the display panel DIS to form in-cell touch sensors. When the touch sensors TS are embedded in the display panel DIS, the common voltage is applied to the Tx lines T1 to Tj during a period in which video data is written to the pixels (i.e., during a write period indicated by 'WR' of FIG. 8). Further, the Tx pulse EXTP is applied to the Tx lines T1 to Tj during a period in which the video data is not written to the pixels (i.e., during a horizontal blank period indicated by 'HB' of FIG. 8). Thus, when the touch sensors TS are embedded in the display panel DIS, the Tx lines T1 to Tj switch between the common voltage and the Tx pulse EXTP.

As shown in FIG. 4, when the touch sensors TS are embedded in the display panel DIS, the touch sensors TS may be formed on the lower glass substrate along with the pixel array of the display panel DIS. In FIG. 4, 'PIX' denotes the pixel electrode of the liquid crystal cell.

The touch sensors TS may be implemented as capacitive touch sensors. In this instance, the capacitive touch sensors may include the Tx lines T1 to Tj positioned parallel to the gate lines G1 to Gn, where j is a positive integer less than n, the Rx lines R1 to Ri which cross the Tx lines T1 to Tj and are positioned parallel to the data lines D1 to Dm, where i is a positive integer less than m, mutual capacitances MC (refer to FIG. 6) which are formed at crossings of the Tx lines T1 to Tj and the Rx lines R1 to Ri, etc.

The display data driving circuit 12 includes a plurality of source drive integrated circuits (ICs). Each of the plurality of source drive ICs includes a shift register, a latch, a digital-to-analog converter (DAC), an output buffer, etc. The source drive ICs latch digital video data RGB received from the timing controller 20. The source drive ICs convert the digital video data RGB into positive and negative analog gamma compensation voltages and output analog video data voltages. The analog video data voltages are supplied to the data lines D1 to Dm.

The display gate driving circuit 14 includes at least one scan drive IC. The scan drive IC includes a level shifter, a shift register, etc. The scan drive IC sequentially supplies the gate pulse (or the scan pulse) synchronized with the analog video data voltage to the gate lines G1 to Gn under the control of the timing controller 20 and selects lines of the display panel DIS to which the analog video data voltage is written. The display gate driving circuit 14 and the display data driving circuit 12 may be formed on the lower glass substrate GLS2 along with the pixel array using gate-in-panel (GIP) technology.

The Tx driving circuit 18 sequentially outputs the Tx pulse EXTP to the Tx lines T1 to Tj in response to a Tx timing control signal Txcon', which is a timing control signal Txcon that has been delayed by a predetermined time period, and sequentially applies the Tx pulse EXTP to the Tx lines T1 to Tj. Hence, the Tx driving circuit 18 scans the touch sensors TS. The Tx pulse EXTP is successively supplied to each of the Tx lines T1 to Tj more than twice for each Tx line. That is, each Tx line receives multiple Tx pulses EXTPs. The Tx driving circuit 18 may be implemented as a scan drive IC substantially having the same circuit configuration as the scan drive IC of the display gate driving circuit 14. The Rx driving circuit 16 senses the touch sensors TS in synchronization with the Tx pulse EXTP, which is successively supplied to each of the Tx lines T1 to Tj more than twice, thereby repeatedly sensing each of the touch sensors TS more than twice in one frame period.

Charges charged to the mutual capacitance MC of the touch sensors TS existing on the first Tx line T1 are input to the Rx driving circuit 16 through the Rx lines R1 to Ri due to the Tx pulse EXTP supplied to the first Tx line T1. Charges charged to the mutual capacitance MC of the touch sensors TS existing on the second Tx line T2 are input to the Rx driving circuit 16 through the Rx lines R1 to Ri due to the Tx pulse EXTP supplied to the second Tx line T2. The Tx driving circuit 18 successively supplies the Tx pulse EXTP to each of the Tx lines T1 to Tj more than twice. For example, the Tx pulse EXTP is repeatedly supplied to the first Tx line T1 N times, where preferably N is a positive integer equal to or greater than 2 and equal to or less than 20. Thus the Rx driving circuit 16 can repeatedly sample the output signal of the touch sensors TS existing on the first Tx line T1 N times. Subsequently, the Tx pulse EXTP is repeatedly supplied to the second Tx line T2 N times, and thus the Rx driving circuit 16 repeatedly samples the output signal of the touch sensors TS existing on the second Tx line T2 N times. In the embodiment of the invention, 'N' may be adjusted depending on the number of lines of the touch screen and sampling operation characteristic of the Rx driving circuit 16.

The Rx driving circuit 16 supplies a touch reference voltage Vref to the Rx lines R1 to Ri in response to an Rx timing control signal Rxcon. The touch reference voltage Vref may be set to a DC voltage which is greater than 0V and equal to or less than about 3V. The Rx driving circuit 16 samples and amplifies changes in an analog output (i.e., the voltage of the mutual capacitance MC) of the touch sensors TS input through the Rx lines R1 to Ri. The Rx driving circuit 16 converts the analog output into digital touch data and transmits the digital touch data to the touch data processing unit 30. The Rx driving circuit 16 samples the output of the touch sensors TS using a capacitor of an integrator for accumulating charges supplied through the Rx lines R1 to Ri. Thus, the Rx driving circuit 16 may detect changes in charges before and after a touch operation only when the charges are sufficiently accumulated on the capacitor of the integrator. For this, the Rx driving circuit 16 samples the output of the touch sensors TS supplied through the Rx lines R1 to Ri at each falling edge of the Tx pulse EXTP, which is successively supplied to each of the Tx lines T1 to Tj N times.

The touch data processing unit 30 analyzes the digital touch data received from the Rx driving circuit 16 using a previously determined touch recognition algorithm and calculates coordinate values of the digital touch data which is equal to or greater than a predetermined reference value. Data of the coordinate values of a touch position output from the touch data processing unit 30 is digital data of HID format and is transmitted to an external host system. The host system runs an application program linked with the data of the coordinate values of the touch position.

The timing controller 20 receives a timing signal, such as a vertical sync signal Vsync, a horizontal sync signal Hsync, a data enable DE, and a main clock MCLK from the external host system. The timing controller 20 generates display timing control signals for controlling operation timings of the display data driving circuit 12 and the display gate driving circuit 14. The timing control signal of the display gate driving circuit 14 includes a gate start pulse GSP, a gate shift clock GSC (GCLK), a gate output enable GOE, a shift direction control signal DIR, etc. The timing control signal of the display data driving circuit 12 includes a source sampling clock SSC, a source output enable SOE, a polarity control signal POL, etc.

The timing controller 20 generates a Tx timing control signal Txcon for controlling timing of the Tx pulse EXTP and the Rx timing control signal Rxcon for controlling sensing timing of the touch sensors TS. The Tx timing control signal Txcon generates a start pulse, which generates an output of a shift register formed inside the Tx driving circuit 18 and shifts and outputs the output of the shift register, an output enable, etc. The Rx timing control signal Rxcon includes a timing control signal of a sampling switch formed inside the Rx driving circuit 16, an analog-to-digital converter (ADC) clock, etc.

The timing controller 20 supplies a timing signal HDIS having I horizontal periods as one cycle to a synchronization control circuit, where I is a positive integer. The timing signal HDIS having the cycle of the I horizontal periods is input to an edge detector 22 of the synchronization control circuit. The timing signal HDIS having the cycle of the I horizontal periods has a cycle of horizontal periods equal to or greater than 'I' so as to repeatedly sense each of the touch sensors TS more than twice. Further, the timing signal HDIS having the cycle of the I horizontal periods has a cycle equal to or less than a half frame period. One horizontal period is a time obtained by dividing one frame period by the number 'm' of lines of the display panel DIS.

The timing signal HDIS having the cycle of the I horizontal periods may be the existing timing signal having a cycle of one horizontal period generated so that the timing controller 20 controls the operation timing of the display driving circuit. The timing signal having the cycle of one horizontal period may be one of the horizontal sync signal Hsync, the data enable DE, the source output enable SOE, the gate shift clock GSC (GCLK), and the gate output enable GOE. The horizontal sync signal Hsync has the cycle of one horizontal period and is input to the timing controller 20. The data enable DE has the cycle of one horizontal period and is input to the timing controller 20 in synchronization with data of one line. The source output enable SOE has the cycle of one horizontal period and controls output timing of the display data driving circuit 12 so that the display data driving circuit 12 generates the video data voltage in each horizontal period. The gate shift clock GSC (GCLK) has the cycle of one horizontal period and controls output timings of the display gate driving circuit 14 and the Tx driving circuit 18 so that they perform the shift operation in each horizontal period. The gate output enable GOE has the cycle of one horizontal period and controls output timing of the display gate driving circuit 14 so that the display gate driving circuit 14 outputs the gate pulse in each horizontal period in synchronization with the video data voltage.

The timing controller 20 may generate the timing signal HDIS having the cycle of the I horizontal periods as a separate signal having a cycle of two or more horizontal periods. Thus, the timing signal HDIS having the cycle of the I horizontal periods may be generated as a signal of various forms by the timing controller 20, in addition to the timing signal having the cycle of one horizontal period.

The synchronization control circuit includes the edge detector 22 and a delay unit 24. The synchronization control circuit may be embedded in the timing controller 20. The edge detector 22 receives the timing signal HDIS having the cycle of the I horizontal periods and detects a rising edge of the timing signal HDIS (i.e., the rising edge of the pulse of the timing signal HDIS). Since a duration of the pulse of the timing signal HDIS is predetermined or fixed, the edge detector 22 can determine an amount of delay to be applied to the delay unit 24 based on the detection of the rising edge of the pulse and generates an edge detecting signal accordingly.

The retarder 24 receives the edge detecting signal output from the edge detector 22 and the Tx timing control signal Txcon output from the timing controller 20. The delay unit 24 counts the edge detecting signal received from the edge detector 22 as the main clock MCLK and retards or delays the Tx timing control signal Txcon by a previously determined count value to generate the delayed Tx timing control signal Txcon'. As a result, the Tx pulse EXTP is delayed by a predetermined time period because of the delayed Tx timing control signal Txcon', and a falling edge of the Tx pulse EXTP is generated in a time avoiding a time at which a maximum voltage of a pixel driving signal is generated. That is, the falling edge of each Tx pulse EXTP will not be aligned with any edge of the timing signal HDIS. Thus, each of the touch sensors TS is sensed in a time avoiding the time at which the maximum voltage of the pixel driving signal is generated. The main clock MCLK may be replaced by an output clock of an oscillator embedded in the timing controller 20 or an output clock of an oscillator embedded in the delay unit 24.

To address the limitations of the related art displays, the present inventors found a period (or time) of the pixel driving signal that most affects the output signals of the touch sensors through experiments. According to the discovery of the present inventors, the period of the pixel driving signal most affecting the output signals of the touch sensors is a time at which the maximum voltage of the gate pulse of the pixel driving signal, the video data voltage, etc. are generated. As a result of the experiments, the present inventors discovered that the period of the pixel driving signal most affecting the output signals of the touch sensors is a time at which the gate pulse is generated and data is charged to the pixels in one horizontal period. In the following description, a maximum pixel driving signal period is a time at which data is written to the pixels of the pixel array, namely, a pixel driving time most affecting the output signals of the touch sensors.

The embodiments of the invention read out the output signals of the touch sensors TS from the timing signal HDIS having the cycle of the I horizontal periods at a predetermined delayed time, thereby reading the output signals of the touch sensors TS in a time avoiding the maximum pixel driving signal period. Further, the embodiments of the invention successively and repeatedly senses the output signal of each touch sensor N times, so as to stably sample the output of each touch sensor TS.

Figure 5:
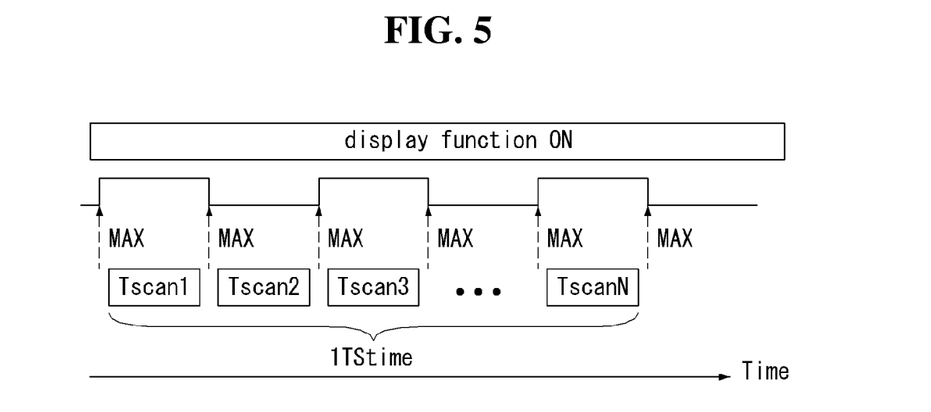
FIG. 5 is a waveform diagram illustrating a method for driving a display device according to an example embodiment of the invention.

FIG. 5 is a waveform diagram illustrating a method for driving the display device according to an embodiment of the invention.

As shown in FIG. 5, the method for driving the display device according to the embodiment of the invention does not divide one frame period into a display period and a touch sensor driving period. Instead, the method sequentially writes video data to the pixels of each line during the one frame period and thereby repeatedly reads out the output signal of each touch sensor N times during a certain time period that avoids the maximum pixel driving signal period MAX.

During the maximum pixel driving signal periods MAX, the TFT connected to the pixel electrode is turned on due to the gate pulse, and the pixel electrode is charged to the video data voltage for a turn-on time of the TFT. Hence, the data is written to the pixels. An avoiding time of the maximum pixel driving signal period including a horizontal blank time exists between the maximum pixel driving signal periods MAX. The falling edge of the Tx pulse EXTP is positioned in the horizontal blank time avoiding the maximum pixel driving signal periods MAX because of the retardation/delay of the timing signal of one horizontal period. The horizontal blank time is a B-scan time existing for a short period of time of a time required to sequentially scan neighboring lines of the display panel DIS. Thus, data is not written to the pixels during the horizontal blank time. The horizontal blank time is also referred to herein as the horizontal blank time period. According to the present invention, the Rx driving circuit 16 samples the output signal of each touch sensor, which is synchronized with the Tx pulse EXTP and is received through the Rx lines R1 to Ri. Thus, in the present invention the output of each touch sensor is repeatedly sampled N times for the N successive horizontal blank time periods, which are time periods that are not part of the maximum pixel driving signal periods. As a result, sensing of the touch sensors occurs selectively only during certain time periods that exclude the maximum pixel driving signal periods.

In FIG. 5, '1TStime' is a time required to stably sample the output signal of one touch sensor and is divided by N touch scanning periods Tscan1 to TscanN.

Each of the touch scanning periods Tscan1 to TscanN includes the horizontal blank time. The output signal of one touch sensor is successively and repeatedly read out N times (i.e., in each of the N touch scanning periods Tscan1 to TscanN). For example, the output of the first touch sensor existing on the first Tx line of the touch screen is successively input to the Rx driving circuit 16 through the Rx lines R1 to Ri for each of the touch scanning periods Tscan1 to TscanN and is sampled by the integrator of the Rx driving circuit 16. Subsequently, the output of the second touch sensor existing on the second Tx line of the touch screen is successively input to the Rx driving circuit 16 through the Rx lines R1 to Ri for touch scanning periods TscanN+1 to Tscan2N (not shown) and is sampled by the integrator of the Rx driving circuit 16.

Figure 6:
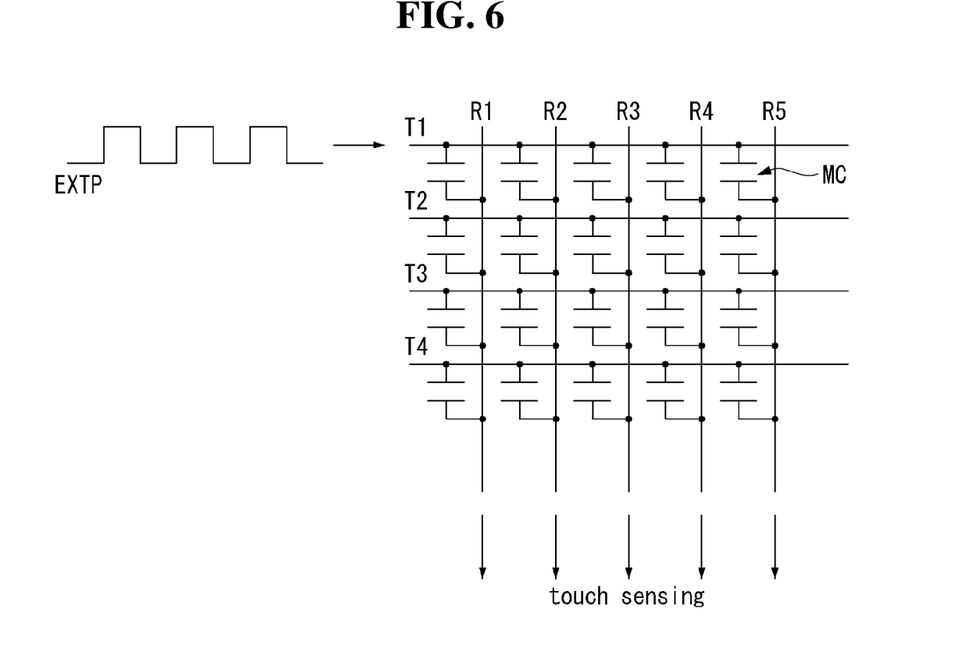
FIG. 6 is an equivalent circuit diagram illustrating touch sensors of a touch screen shown in FIG. 1 and an example of a Tx pulse according to an embodiment of the present invention.

FIG. 6 is an equivalent circuit diagram illustrating an example of the touch sensors TS and the Tx pulse EXTP.

As shown in FIG. 6, the touch sensors TS include Tx lines T1 to T4, Rx lines R1 to R5 crossing the Tx lines T1 to T4, and mutual capacitances MC formed at crossings of the Tx lines T1 to T4 and the Rx lines R1 to R5.

The Tx driving circuit 18 sequentially supplies the Tx pulse EXTP to the Tx lines T1 to T4. The Tx pulse EXTP is successively supplied to each of the Tx lines T1 to T4, N times. The Rx driving circuit 16 samples outputs of the mutual capacitances MC received through the Rx lines R1 to R5 at each falling edge of the Tx pulse EXTP.

Figure 7:
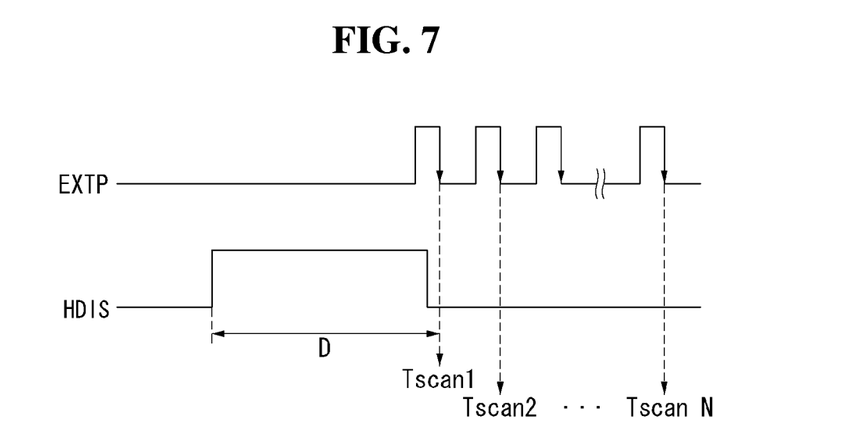
FIG. 7 is a waveform diagram illustrating an example of a Tx pulse and a timing signal having a cycle of one horizontal period according to an embodiment of the present invention.

FIG. 7 is a waveform diagram illustrating an example of the Tx pulse EXTP and the timing signal HDIS having the cycle of the I horizontal periods.

As shown in FIG. 7, the synchronization control circuit retards or delays the Tx timing control signal Txcon by a predetermined time D based on the timing signal HDIS having the cycle of the I horizontal periods. The predetermined time D may be determined by counting the number of clocks from a rising edge of the timing signal HDIS having the cycle of the I horizontal periods. The predetermined time D is previously determined so that the falling edge of any Tx pulse EXTP is generated in a time avoiding the maximum pixel driving signal period.

Figure 8:
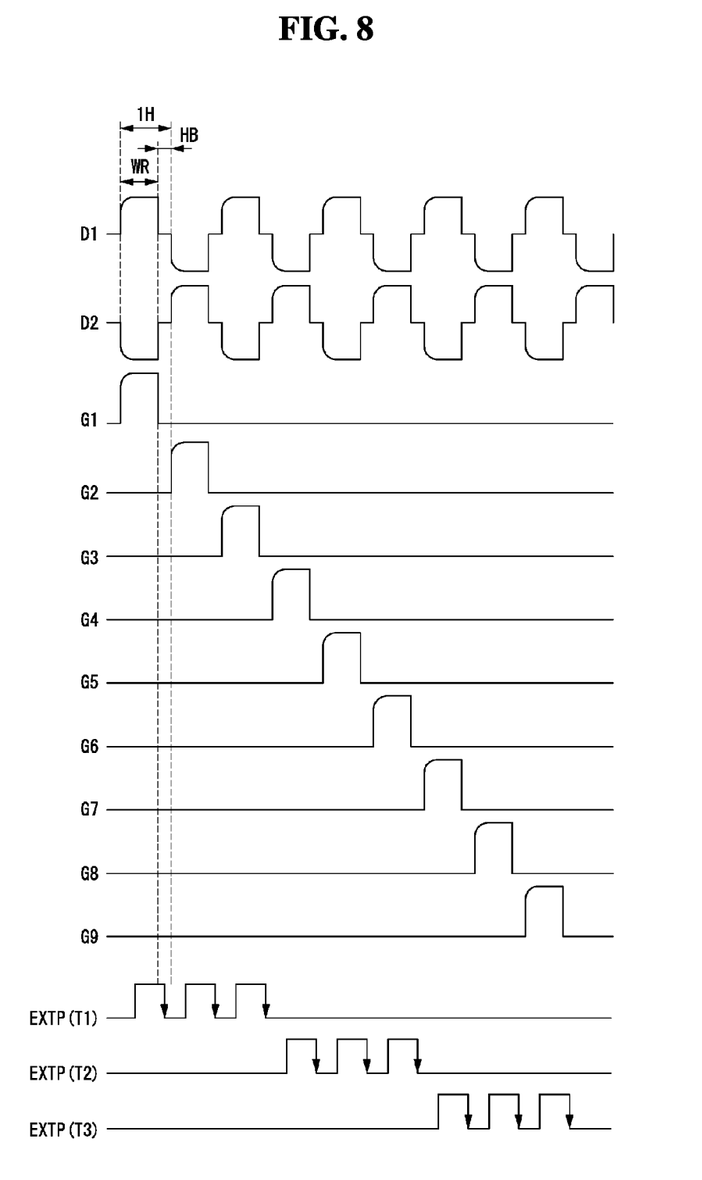
FIG. 8 is a waveform diagram illustrating an example of pixel driving signals supplied to pixels of a display device shown in FIG. 1 and an example of a Tx pulse supplied to touch sensors of a touch screen according to an embodiment of the present invention.

FIG. 8 is a waveform diagram illustrating the pixel driving signals supplied to the pixels of the display device shown in FIG. 1 and the Tx pulse supplied to the touch sensors of the touch screen.

As shown in FIG. 8, one horizontal period 1H is a time required to scan one horizontal line of the display panel DIS. The one horizontal period 1H includes a data writing period WR and a horizontal blank period HB (horizontal blank time). The horizontal blank period HB is a time obtained by subtracting the data writing period WR from the one horizontal period 1H.

The maximum pixel driving signal period includes the data writing period WR, but does not include the horizontal blank period HB. During the data writing period WR, the gate pulse is generated, and the video data voltage is supplied to the pixel electrodes of the pixels in response to the gate pulse. However, the time avoiding the maximum pixel driving signal period includes the horizontal blank period HB. The horizontal blank period HB is a period between a falling edge of one gate pulse and a rising edge of an immediate next gate pulse of the one gate pulse. During the horizontal blank period HB, the video data voltage is not written to the pixels.

The Tx pulse EXTP is sequentially supplied to the Tx lines T1 to T3. In this instance, the Tx pulse EXTP is successively supplied to each of the Tx lines T1 to T3, N times, and the falling edge of the Tx pulse EXTP exists in the horizontal blank period HB. FIG. 8 illustrates an example where the Tx pulse EXTP is successively supplied to each of the Tx lines T1 to T3, three times (i.e., N=3 in this example). The number of Tx pulses EXTP successively supplied to each of the Tx lines T1 to T3 is not limited to three, and can be any number such as more than three.

The first to third Tx pulses EXTP are successively supplied to the first Tx line T1, and falling edges of the first to third Tx pulses EXTP all exist in the corresponding horizontal blank period HB. Subsequently, the fourth to sixth Tx pulses EXTP are successively supplied to the second Tx line T2, and falling edges of the fourth to sixth Tx pulses EXTP all exist in the corresponding horizontal blank period HB. Subsequently, the seventh to ninth Tx pulses EXTP are successively supplied to the third Tx line T3, and falling edges of the seventh to ninth Tx pulses EXTP all exist in the corresponding horizontal blank period HB. That is, according to the present invention, the falling edge of any and all Tx pulses EXTP is generated so that the falling edge falls only during a horizontal blank period HB, so as to avoid the maximum pixel driving signal periods. The Rx driving circuit 16 then samples the output of the touch sensors TS through the Rx lines R1 to Ri at each of the falling edges of the Tx pulses EXTP, whereby the outputs of the touch sensors are not influenced by any pixel driving signal.

The present inventors has driven the display device shown FIG. 1 using the method illustrated in FIGS. 5 to 8 and has conducted evaluation experiments depending on whether or not the Tx pulse is delayed, so as to evaluate the effects of the embodiment of the invention, which will be discussed below in more detail by referring to FIGS. 9-12.

Figure 9:
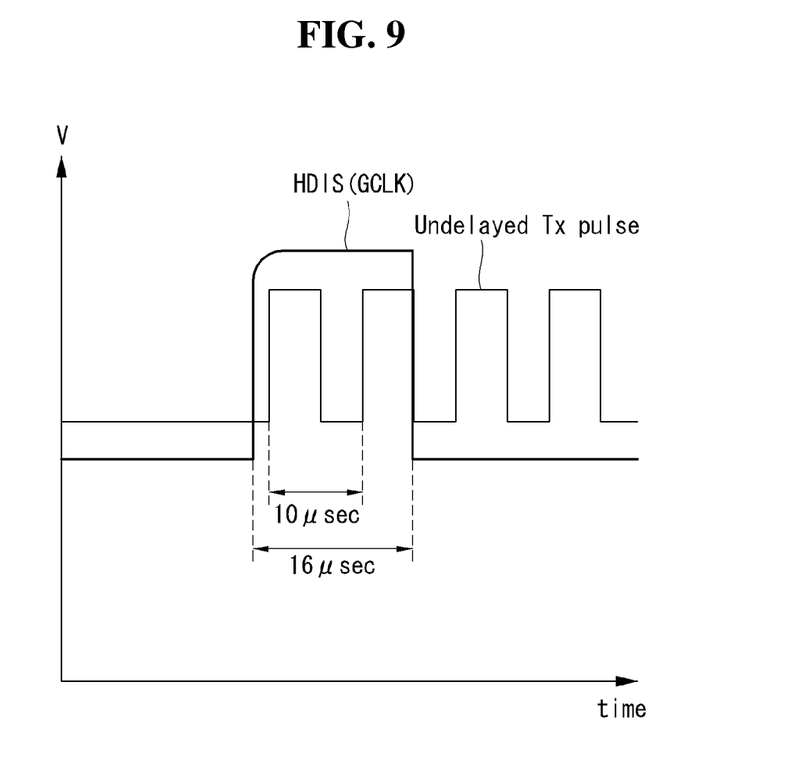
FIG. 9 is a waveform diagram illustrating a waveform of a Tx pulse that is not delayed in an experiment.
Figure 10:
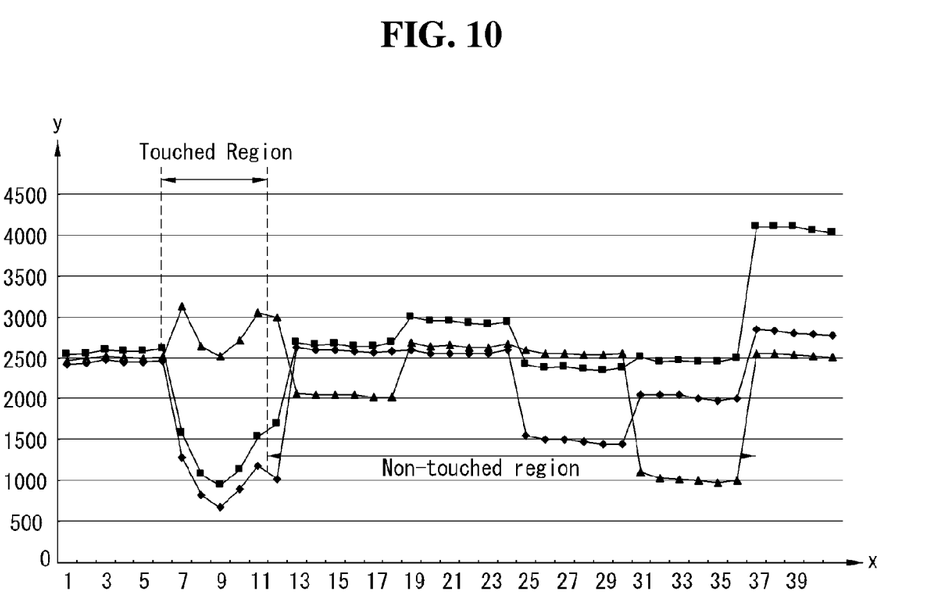
FIG. 10 illustrates an example of an output of touch sensors measured in the experiment in which the Tx pulse not delayed as shown in FIG. 9 is supplied to Tx lines.
Figure 11:
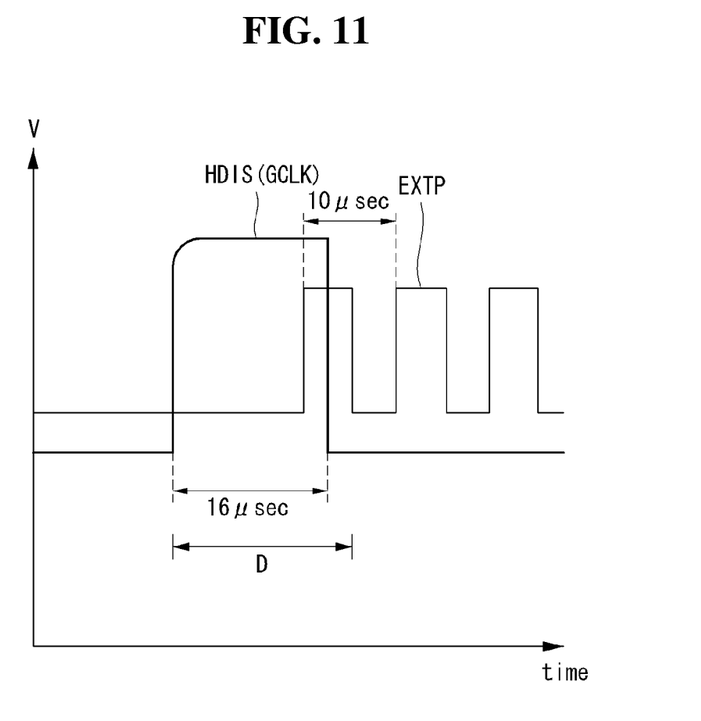
FIG. 11 is a waveform diagram illustrating an example of a waveform in an experimental condition where a Tx pulse is delayed by a predetermined time so that a falling edge of the Tx pulse avoids a maximum pixel driving signal period according to an embodiment of the present invention.
Figure 12:
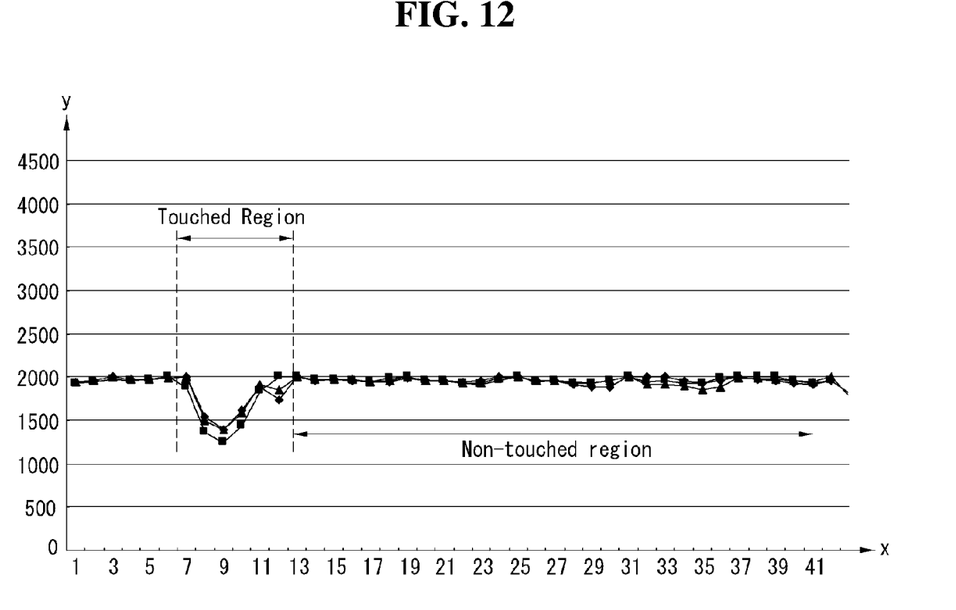
FIG. 12 illustrates an example of an output of touch sensors measured in an experiment in which the Tx pulse delayed as shown in FIG. 11 is supplied to Tx lines according to an embodiment of the present invention.

FIG. 9 is a waveform diagram illustrating a waveform in an experimental condition where a Tx pulse is not delayed. FIG. 10 illustrates the output of the touch sensors measured in an experiment in which the not-delayed Tx pulse shown in FIG. 9 is supplied to the Tx lines. In contrast, FIG. 11 is a waveform diagram illustrating a waveform in an experimental condition where the Tx pulse EXTP (which is a Tx pulse that has been delayed by a predetermined time) is supplied to the Tx lines, so that the falling edge of the Tx pulse EXTP avoids the maximum pixel driving signal period. FIG. 12 illustrates the output of the touch sensors measured in an experiment in which the Tx pulse EXTP shown in FIG. 11 is supplied to the Tx lines. In FIGS. 9 and 11, the x-axis is a time, and the y-axis is a voltage. In FIGS. 10 and 12, the x-axis is a number of the touch sensors arranged along the x-axis of the touch screen in a line, and the y-axis is touch sensor output values converted into digital touch data by the Rx driving circuit 16.

A display device used in the experiment of FIGS. 9 to 12 substantially had the same circuit configuration as the display device shown in FIG. 1, and the GIP type display gate driving circuit 14 and the pixel array were formed on the lower glass substrate. In the experiment of FIGS. 9 to 12, the gate shift clock GSC (GCLK) of the display gate driving circuit 14 and the gate shift clock GSC (GCLK) of the Tx driving circuit 18 were selected as the timing signal HDIS having the cycle of the I horizontal periods applied based on the timing of the Tx pulse EXTP. Further, in the experiment of FIGS. 9 to 12, one cycle of the Tx pulse EXTP was about 16 μsec, and one cycle of the gate shift clock GSC (GCLK) was about 10 μsec.

As shown in FIG. 9, when the Tx pulse was not delayed, the falling edge of the Tx pulse was generated in the maximum pixel driving signal period. In this instance, as shown in FIG. 10, when the output of the touch sensors was measured at the falling edge of the Tx pulse, the voltage read out in each of a touched region and a non-touched region of the touch sensors showed different values in each measurement of the experiment because of the influence of the voltage of the gate pulse generated in the maximum pixel driving signal period and the video data voltage. As indicated by the graph of FIG. 10, since the voltage of each of the touched region and the non-touched region showed the different values in each measurement, it was difficult to determine whether or not a touch input to the display device was received. Therefore, the reliability of the output signals of the touch sensors was reduced, and the touch sensitivity was reduced.

In contrast, in FIG. 11, the Tx pulse EXTP (which was a Tx pulse that has been delayed by a predetermined time (about 12 μsec in the experiment as an example)), and thus the falling edge of the Tx pulse EXTP was generated in a time avoiding the maximum pixel driving signal period according to the present invention. In this instance, as shown in FIG. 12, there was a great difference between the voltages of the touched region and the non-touched region of the touch sensors, and the voltage of each of the touched region and the non-touched region showed the similar values in each measurement of the experiment. Since the touch sensors were sampled in a time avoiding the maximum pixel driving signal period by using the Tx pulse EXTP and based on the detected voltages as shown in FIG. 12, a determination that a touch input to the display device has been made was made with high accuracy. As a result, using the present invention, the reliability of the output signals of the touch sensors is increased, and the touch sensitivity is increased without having to divide a frame period into a display period and a touch sensor driving period.

As described above, the embodiments of the invention repeatedly write data to the pixels during one frame period and samples the output signals of the touch sensors in a time avoiding the data writing period (i.e., the maximum pixel driving signal period) in which the pixel driving signal has the maximum voltage. Hence, when the output of the touch sensors is sampled, an influence of the driving signal on the pixel array can be prevented or reduced, and a limit in a driving time of the pixel array and a driving time of the touch sensors can be reduced or eliminated.

Although embodiments have been described with reference to a number of illustrative embodiments thereof, it should be understood that numerous other modifications and embodiments can be devised by those skilled in the art that will fall within the scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A touch-sensitive display device comprising:
    a display panel including data lines, gate lines crossing the data lines, and a pixel array including pixels arranged in a matrix form;
    a touch screen including Tx lines, Rx lines crossing the Tx lines, and touch sensors formed at crossings of the Tx lines and the Rx lines;
    a display driving circuit configured to supply video data voltages to the pixels of the display panel; and
    a touch screen driving circuit configured to sequentially supply at least one delayed pulse of a plurality of delayed pulses to each of the Tx lines, and sense an output signal of each of the touch sensors through the Rx lines,
    wherein a falling edge of each of the at least one delayed pulse supplied to the Tx lines of the touch screen is present in a horizontal blank period of gate voltages supplied to the pixels of the display panel,
    wherein the touch screen driving circuit samples the output signal of each of the touch sensors through the Rx lines in synchronization with the falling edge of each of the at least one delayed pulse of the plurality of delayed pulses supplied to the Tx lines of the touch screen within the horizontal blank period of gate voltages supplied to the pixels of the display panel, and
    wherein the horizontal blank period corresponds to a period when data is not written to the pixels.

2. The touch-sensitive display device of claim 1, wherein the falling edge of each of the at least one delayed pulse falls during a corresponding horizontal blank period.

3. The touch-sensitive display device of claim 1, wherein each of the at least one delayed pulse supplied to one of the Tx lines is not aligned with a gate pulse supplied to a corresponding one of the gate lines.

4. The touch-sensitive display device of claim 1, wherein the at least one delayed pulse includes a plurality of delayed pulses consecutively supplied to each of the Tx lines.

5. The touch-sensitive display device of claim 4, wherein the plurality of delayed pulses equal at least three delayed pulses consecutively supplied to each of the Tx lines.

6. The touch-sensitive display device of claim 1, further comprising a synchronization control circuit including:
    an edge detector configured to detect a rising edge of a timing signal, and
    a delay unit configured to generate a Tx timing control signal delayed by a predetermined time period from the detected rising edge of the timing signal, and output the delayed Tx timing control signal to the touch screen driving circuit for generating the at least one delayed pulse.

7. The touch-sensitive display device of claim 1, wherein the display panel and the touch screen are stacked up and aligned with each other.

8. The touch-sensitive display device of claim 1, wherein the display panel includes:

a glass substrate having the data lines, the gate lines, and the pixel array, and a polarizing layer disposed over the glass substrate; and wherein the touch screen is disposed over the polarizing layer, or between the polarizing layer and the glass substrate.

9. The touch-sensitive display device of claim 1, wherein the display panel includes a glass substrate having the data lines, the gate lines, and the pixel array, and wherein the touch sensors are disposed within the pixel array of the glass substrate.

10. The touch-sensitive display device of claim 1, wherein the touch-sensitive display is one of a liquid crystal display, a field emission display, a plasma display panel, an organic light emitting diode display, and an electrophoresis display.

11. A method of operating a touch-sensitive display device, the touch-sensitive display device including a display panel, a touch screen, a display driving circuit and a touch screen driving circuit, the display panel including data lines, gate lines crossing the data lines, and a pixel array including pixels arranged in a matrix form, the touch screen including Tx lines, Rx lines crossing the Tx lines, and touch sensors formed at crossings of the Tx lines and the Rx lines, the display driving circuit configured to supply video data voltages to the pixels of the display panel, the method comprising:

operating the touch screen using the touch screen driving circuit, wherein the operating step includes:

sequentially supplying, by the touch screen driving circuit, at least one delayed pulse of a plurality of delayed pulses to each of the Tx lines of the touch screen, wherein a falling edge of each of the at least one delayed pulse supplied to the Tx lines of the touch screen is present in a horizontal blank period of gate voltages to the pixels of the display panel, and sampling, by the touch screen driving circuit, an output signal of each of the touch sensors through the Rx lines in synchronization with the falling edge of each of the at least one delayed pulse of the plurality of delayed pulses supplied to the Tx lines of the touch screen within the horizontal blank period of gate voltages supplied to the pixels of the display panel, and wherein the horizontal blank period corresponds to a period when data is not written to the pixels.

12. The method of claim 11, wherein in the supplying step, the falling edge of each of the at least one delayed pulse falls during a corresponding horizontal blank period.

13. The method of claim 11, wherein in the supplying step, each of the at least one delayed pulse supplied to one of the Tx lines is not aligned with a gate pulse supplied to a corresponding one of the gate lines.

14. The method of claim 11, wherein the at least one delayed pulse includes a plurality of delayed pulses, and wherein the supplying step supplies consecutively the plurality of delayed pulses to each of the Tx lines.

15. The method of claim 14, wherein the plurality of delayed pulses equal at least three delayed pulses consecutively supplied to each of the Tx lines.

16. The method of claim 11, wherein the touch-sensitive display device further comprises a synchronization control circuit including an edge detector and a delay unit, and wherein the supplying step includes:

detecting, by the edge detector, a rising edge of a timing signal, generating, by the delay unit, a Tx timing control signal delayed by a predetermined time period from the detected rising edge of the timing signal, outputting the delayed Tx timing control signal to the touch screen driving circuit, and generating the at least one delayed pulse based on the delayed Tx timing control signal.

\* \* \* \* \*